United States Patent
Abramson

(10) Patent No.: US 11,853,063 B2
(45) Date of Patent: Dec. 26, 2023

(54) OUTDOOR POWER EQUIPMENT MACHINE WITH PRESENCE DETECTION

(71) Applicant: MTD PRODUCTS INC, Valley City, OH (US)

(72) Inventor: Shai Abramson, Halutz (IL)

(73) Assignee: MTD PRODUCTS INC, Valley City, OH (US)

( * ) Notice: Subject to any disclaimer, the term of this patent is extended or adjusted under 35 U.S.C. 154(b) by 0 days.

(21) Appl. No.: 17/983,846

(22) Filed: Nov. 9, 2022

(65) Prior Publication Data
US 2023/0081732 A1 Mar. 16, 2023

Related U.S. Application Data

(63) Continuation of application No. 16/717,128, filed on Dec. 17, 2019, now Pat. No. 11,500,383.

(30) Foreign Application Priority Data

Dec. 21, 2018 (GB) ..................................... 1821096

(51) Int. Cl.
| | |
|---|---|
| *G05D 1/00* | (2006.01) |
| *A01D 34/00* | (2006.01) |
| *G05D 1/02* | (2020.01) |
| *G06V 20/58* | (2022.01) |
| *G06V 40/10* | (2022.01) |

(52) U.S. Cl.
CPC ......... *G05D 1/0088* (2013.01); *A01D 34/008* (2013.01); *G05D 1/0246* (2013.01); *G06V 20/58* (2022.01); *G06V 40/10* (2022.01); *G05D 2201/0201* (2013.01); *G05D 2201/0208* (2013.01)

(58) Field of Classification Search
CPC .. G05D 1/0088; G05D 1/0246; G05D 1/0214; G05D 2201/0201; G05D 2201/0208; A01D 34/008; A01D 34/00; A01D 2101/00; G06V 20/58; G06V 40/10; B25J 19/023; B25J 9/1697
See application file for complete search history.

(56) References Cited

U.S. PATENT DOCUMENTS

| | | | | |
|---|---|---|---|---|
| 2018/0077860 | A1* | 3/2018 | Einecke | ............... A01D 75/185 |
| 2018/0103579 | A1* | 4/2018 | Grufman | ............... A01D 34/008 |
| 2019/0352885 | A1* | 11/2019 | Kurokami | ................. B60R 1/00 |

FOREIGN PATENT DOCUMENTS

WO WO20180135988 A1 * 7/2018

* cited by examiner

*Primary Examiner* — Michael J Zanelli
(74) *Attorney, Agent, or Firm* — WEGMAN HESSLER VALORE

(57) ABSTRACT

A mobile outdoor power equipment machine for performing a controlled task within a work area includes a drive system for providing movement of the machine, a working apparatus for performing the task, and a scanning system for scanning an area surrounding the machine. The scanning system is configured to provide detection of physical elements in the environment to aid in navigation of the machine. In an embodiment, the scanning system and a control system are configured to scan the area, determine the presence of a physical element in the area, determine that the physical element is located within the work area, determine the proximity of the physical element to the machine, and direct a behavior of the machine.

20 Claims, 8 Drawing Sheets

OUTDOOR POWER EQUIPMENT MACHINE WITH PRESENCE DETECTION

CROSS REFERENCE TO RELATED APPLICATIONS

This application is a continuation of, and claims the priority filing benefit of U.S. patent application Ser. No. 16/717,128 filed on Dec. 17, 2019, and United Kingdom Patent Application No. 1821096.3, filed on Dec. 21, 2018, the entire disclosures of which are incorporated herein by reference.

FIELD OF INVENTION

The disclosed technology relates generally to outdoor power equipment, and more Particularly to an outdoor power equipment machine having presence detection functionality for improved navigation, obstacle avoidance and work efficiency.

BACKGROUND

The use of automated devices is widespread and finds countless applications. Robots perform precise and delicate tasks in the construction of electronic devices, in medicine and in aviation. Robots also are used in applications that require motion, for example for automatic warehouses, where goods are retrieved and stored by automated robots. Other applications include fetching raw materials in the course of industrial manufacturing and removing and packaging finished pieces. In home-related or domestic robotics fields, attempts have been made to exploit robots for such tasks as lawn mowing, snow blowing, leaf clearing, surface cleaning, pool cleaning and vacuum cleaning.

Even with conventional control systems and methods for autonomous navigation by robots within a working area, such navigation has not yet been perfected. For example, issues of efficient coverage of the area, ease of setup of the system, and avoidance techniques remain.

SUMMARY

Aspects of the present disclosure may address one or more of these issues and may additionally or alternatively address other issues in domestic robotics.

Disclosed is a mobile machine, such as a mobile outdoor power equipment machine, for performing a controlled work task. The mobile machine includes a drive system for providing movement of the machine, a working apparatus for performing the work task, and a scanning system for scanning an area surrounding and extending from the machine. The scanning system is configured to provide detection of elements in the environment to aid in navigation of the machine, including obstacle avoidance. A control system is provided for controlling one or more of the drive system, working apparatus, and scanning system.

The scanning system and the control system are jointly configured to scan an area, determine the presence of a physical element in the area, determine the proximity of the physical element to the machine, determine a confidence level that the physical element is an animate being, and direct a behavior of the machine correlating to a combination of the confidence level and the proximity of the physical element to the mobile outdoor power equipment machine. In this way, the machine, such as a domestic robot, is configured to display enhanced avoidance techniques with respect to physical elements disposed in the work area during performance of the task or during travel to and from the task. The scanning system and/or control system also can be configured to provide additional versatility to the user beyond the performance of the base task, such as in presence detection of elements of the work area to be further addressed, treated, mended, evaluated, etc.

According to one aspect, a method for presence detection of one or more physical elements of an area surrounding a mobile outdoor power equipment machine includes (a) scanning an area surrounding the mobile outdoor power equipment machine with a sensing apparatus of the mobile outdoor power equipment machine; (b) analyzing data derived from the scanning to identify a presence of a physical element in the area; (c) analyzing data derived from the scanning to determine whether the physical element is located within a work area; (d) determining a proximity of the physical element to the mobile outdoor power equipment machine; (e) determining a confidence level of whether the physical element is an animate being; and (f) a control system of the mobile outdoor power equipment machine coupled to the sensing apparatus directing a behavior of the mobile outdoor power equipment correlating to a combination of the determination of the physical element being an animate being, the determination that the physical element is located within the work area, and the proximity of the physical element to the mobile outdoor power equipment machine.

The method can include determining that the physical element is located within the work area including analyzing data derived from the scanning and associated with an area adjacent to the physical element.

The method can include determining that the physical element is located within the work area is based on a location of the mobile outdoor power equipment machine relative to the work area and the proximity of the physical element to the mobile outdoor power equipment machine.

The proximity can be a linear distance from the mobile outdoor power equipment machine to the identified physical element.

The method further can include determining the directed behavior in accordance with a dual classification of the confidence level of whether the physical element is an animate being, and the location or proximity of the physical element relative to the mobile outdoor power equipment machine, and directing at least two different behaviors of the mobile outdoor power equipment machine in response to two different respective dual classifications.

The sensing apparatus can be a camera.

The determining a confidence level can include using silhouette detection or determining whether the physical element includes facial features.

According to another aspect, a method for presence detection of one or more physical elements in an area surrounding a mobile outdoor power equipment machine includes (a) digitally sectioning a predefined area disposed at least partially about the mobile outdoor power equipment machine into sections, the predefined area extending outwardly from the mobile outdoor power equipment machine; (b) scanning an environment surrounding the mobile outdoor power equipment machine with a sensing apparatus of the mobile outdoor power equipment machine; (c) analyzing data derived from the scanning to identify a presence of a physical element in the scanned environment; (d) analyzing data derived from the scanning to determine whether the physical element is located within a work area; (e) determining a location of the physical element within the sectioned predefined area applied to the scanned environment; (f) determining a confidence level of whether the physical element is an animate being; and (g) a control system of the mobile outdoor power equipment machine directing a behavior of the mobile outdoor power equipment machine correlating to a combination of the determination of the physical element being an animate being, the determination that the physical element is located within the work area, and the location of the physical element within the sections.

The digitally sectioning a predefined area can include fully sectioning the predefined area into interconnected sections of varying numerical areas.

The method can include determining that the physical element is located within the work area including analyzing data derived from the scanning and associated with an area adjacent to the physical element.

The method can include determining that the physical element is located within the work area is based on a location of the mobile outdoor power equipment machine relative to the work area and the proximity of the physical element to the mobile outdoor power equipment machine The method further can include assigning a dual classification to each of the sections, the dual classification including an indication of whether a portion of the physical element is disposed in the section, and a confidence level of whether the physical element is an animate being, and directing at least two different behaviors of the mobile outdoor power equipment in response to two different respective dual classifications.

The digitally sectioning a predefined area can include the predefined area being fixed relative to a pre-designated side of the machine, such that the predefined area translates jointly with the machine.

The digitally sectioning a predefined area can include sectioning into polygonal shapes, with each section sharing a boundary with at least one other section.

The area can be a planar area applied to an actual topography of the environment scanned by the sensing apparatus.

The predefined area can be shaped as a circular sector.

The sensing apparatus can be a camera.

The determining whether the physical element is an animate being can include using silhouette detection or determining whether the physical element includes facial features.

According to still another aspect, a mobile outdoor power equipment machine includes a body supported by a chassis, one or more movable ground engaging members movably coupled to the chassis and movable by a prime mover, a sensing apparatus for scanning an area surrounding the mobile outdoor power equipment machine, a signal processing unit configured to analyze signals received by the sensing apparatus, and a control system of the mobile outdoor power equipment machine having a processor and a memory. The control system is configured to (a) analyze an output of the signal processing unit and determine the presence of a physical element in the area, (b) analyze the output of the signal processing unit and determine whether the physical element is located within a work area, (c) determine the proximity of the physical element to the mobile outdoor power equipment machine, (d) determine a confidence level of whether the physical element is an animate being, and (e) direct a behavior of the mobile outdoor power equipment machine correlating to a combination of the determination of the physical element being an animate being, the determination that the physical element is located within the work area, and the proximity of the physical element to the mobile outdoor power equipment machine.

The control system of the mobile outdoor power equipment machine can be configured to determine whether the physical element is located within the work area based on an analysis of data associated with an area adjacent to the physical element.

The control system of the mobile outdoor power equipment machine can be configured to determine whether the physical element is located within the work area based on a location of the mobile outdoor power equipment machine relative to the work area and the proximity of the physical element to the mobile outdoor power equipment machine.

The mobile outdoor power equipment machine further can include a ground surface maintenance apparatus for cutting, blowing, applying water, and/or applying a chemical to the ground surface.

The mobile outdoor power equipment machine can include a visual or auditory system for providing warning within the scanned area of movement of the mobile outdoor power equipment machine through the scanned area.

The mobile outdoor power equipment machine can include a working apparatus for modifying a work area during movement through the work area.

The sensing apparatus can be a camera electronically coupled to each of the signal processing unit and the control system.

The mobile outdoor power equipment machine further can include a visual display of the area scanned by the sensing apparatus.

According to still another aspect, a method for presence detection of one or more physical elements of an area surrounding a mobile outdoor power equipment machine, the method comprising scanning an area surrounding the mobile outdoor power equipment machine with a sensing apparatus of the mobile outdoor power equipment machine, and analyzing data derived from the scanning to identify a presence of a physical element in the area. The method further comprising determining a proximity of the physical element to the mobile outdoor power equipment machine, and determining a confidence level of whether the physical element is an animate being. The method further comprising controlling a control system of the mobile outdoor power equipment machine coupled to the sensing apparatus, wherein controlling comprises the control system directing a behavior of the mobile outdoor power equipment based on a combination of the determination of the physical element being an animate being, the determination that the physical element is located within the scanned area, and the proximity of the physical element to the mobile outdoor power equipment machine.

The method can include analyzing the output of the signal processing unit to determine whether the physical element is located within a work area, and can include the directed behavior of the mobile outdoor power equipment machine being based, at least in part, on the determination that the physical element is located within the work area.

The method may further comprise the optional features listed above in relation to the other aspects of the disclosed technology described above.

According to still another aspect, a method for presence detection of one or more physical elements in an area surrounding a mobile outdoor power equipment machine, the method comprising digitally sectioning a predefined area extending outwardly from the mobile outdoor power equipment machine, and scanning an environment surrounding the mobile outdoor power equipment machine with a sensing apparatus of the mobile outdoor power equipment machine. The method further comprising analyzing data derived from the scanning to identify a presence of a physical element in the scanned environment, and determining a location of the physical element within the sectioned predefined area applied to the scanned environment.

The method can include determining a confidence level of whether the physical element is an animate being, and controlling, a control system of the mobile outdoor power equipment machine, wherein controlling comprises the control system directing a behavior of the mobile outdoor power equipment machine based on a combination of the determination of the physical element being an animate being, the determination that the physical element is located within the predefined area, and the location of the physical element within the sections.

The method can include analyzing the output of the signal processing unit to determine whether the physical element is located within a work area, and can further comprise the directed behavior of the mobile outdoor power equipment machine being based, at least in part, on the determination that the physical element is located within the work area.

The method can further comprise the optional features listed above in relation to the other aspects of the disclosed technology.

According to still another aspect, a mobile outdoor power equipment machine, comprising a chassis, one or more movable ground engaging members movably coupled to the chassis, a sensing apparatus for scanning an area surrounding the mobile outdoor power equipment machine, a signal processing unit configured to analyze signals received from the sensing apparatus, and a control system of the mobile outdoor power equipment machine having a processor and a memory. The control system configured to analyze an output of the signal processing unit and determine the presence of a physical element in the area, determine the proximity of the physical element to the mobile outdoor power equipment machine, determine a confidence level of whether the physical element is an animate being, and direct a behavior of the mobile outdoor power equipment machine based on a combination of the determination of the physical element being an animate being, the determination that the physical element is located within the scanned area, and the proximity of the physical element to the mobile outdoor power equipment machine.

The mobile outdoor power equipment machine can include analyzing the output of the signal processing unit to determine whether the physical element is located within a work area, and can include the directed behavior of the mobile outdoor power equipment machine being based, at least in part, on the determination that the physical element is located within the work area.

The mobile outdoor equipment machine can include a body supported by the chassis.

The mobile outdoor equipment machine can include that the one or more movable ground engaging members movably coupled to the chassis are movable by a prime mover.

The mobile outdoor power equipment can include the optional features listed above in relation to the other aspects of the disclosed technology.

The foregoing and other features of the disclosed technology are hereinafter described in greater detail with reference to the accompanying drawings.

BRIEF DESCRIPTION OF THE DRAWINGS

The annexed drawings, which are not necessarily to scale, show various aspects of the disclosure.

DETAILED DESCRIPTION

Figure 1:
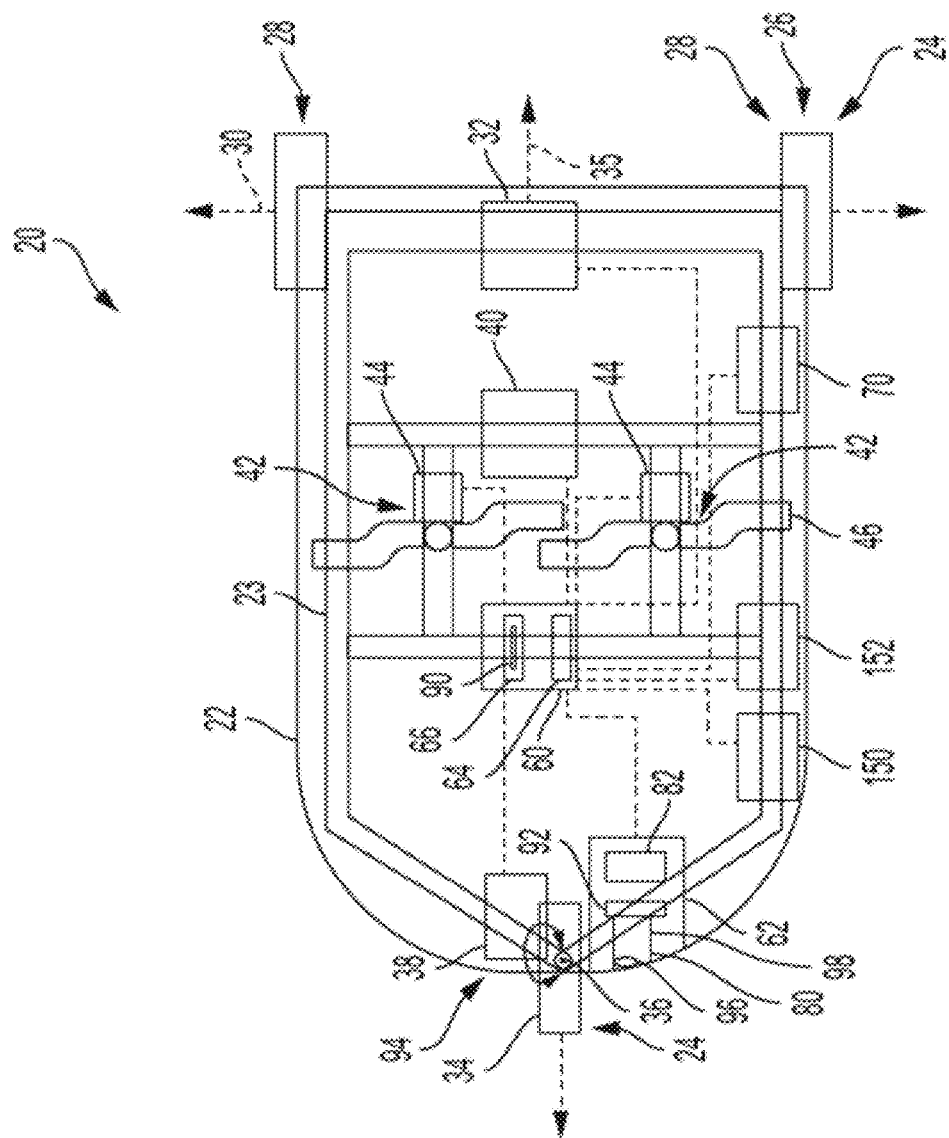
FIG. 1 is a schematic view of a mobile outdoor power equipment machine according to the present disclosure.

The principles of the present disclosure have general application to navigation systems and more particular application to a presence detection system of a mobile machine, such as a mobile outdoor power equipment machine, which can be a domestic or home robot for completing outdoor tasks. While the present disclosure is directed to a mobile outdoor power equipment machine, such as a domestic robot with a lawn cutting mechanism, the machine and method disclosed also have utility for non-mobile machines, or mobile machines that are not associated with outdoor power equipment or outdoor tasks.

As used herein, the term outdoor power equipment machine includes equipment for attending to conventional outdoors jobs, including, but not limited to, moving a load, maintaining a lawn, field, or other area, cutting, trimming, blowing, and the like. The outdoor power equipment machine can include autonomous machines, as well as manually operated machines such as walk-behind mowers, riding mowers, blowers, snow throwers, and the like.

As used herein, the term "work area" refers to an area within which the outdoor power equipment machine is intended to operate, or to perform a task. In some embodiments, the work area can be defined by a boundary, for example, a wire arranged around the perimeter of the work area. The wire separates the work area, lying within the perimeter defined by the wire, from a non-work area, which lies outside of the perimeter defined by the wire.

The terms domestic robotics and home robotics are used in contradistinction to industrial robotics. The user of a home or domestic robot generally will be an average consumer and generally cannot be presumed to have the skills required to carry out complex maintenance or setup of the system, as might be the case in industrial robotics. In addition, ease of use and simple and robust setup procedures can be particularly important in home or domestic robotic systems. A sub-category of domestic robots is garden-based domestic robots, which include robots able to perform the aforementioned tasks of lawn mowing, snow-blowing and leaf-clearing. Robotic lawnmowers are a commercially available example of such autonomous machines, substantially reducing the time and effort required on the part of the user to maintain a neatly-kept lawn.

Autonomous machines such as robots can represent a significant labor-savings for consumers. Repetitive and time-consuming tasks can be carried out without significant supervision or instruction by the user of such autonomous machines. To further reduce the amount of supervision and instruction necessary, sophisticated control systems have been proposed that increase the independence of the machines. Controlled area coverage by robotic appliances is used in a growing number of applications, such as robotic lawn mowers, robotic vacuum cleaners, robotic window cleaners, robotic painting and the like. In such applications, the robot typically is moving within a working area defined by a boundary, such as the floor of a room in the case of a robotic vacuum cleaner, or a lawn or garden in the case of a robotic lawnmower or snow blower. The robot can be provided with sensors, such as tactile, optical, electromagnetic sensors etc., to detect this boundary directly.

The robot typically carries a working apparatus or payload across the entire area until adequately covered. The payload can include one or more cutting blades, vacuuming nozzles, rotating brushes, painting brushes etc., depending on the function that the robot is intended to serve. There are various strategies of area coverage, such as random and systematic coverage, and various paths of movement used for the actual scanning such as straight lines, either parallel or with varying directions, spirals (e.g., gradually increasing 25 radius), etc.

The present disclosure is at least partially concerned with a garden-based domestic robot having a system for environment detection within a work area about the robot during its movement, whether while performing a task or while navigating to or from a location of task performance. Aspects described in the present disclosure can be embodied in any one or more of a system including hardware and/or software, software apart from hardware, or a method. The disclosure describes environment detection features that can be used in combination or separately from one another, which features include presence detection and classification of physical elements, classification of abnormalities, and mapping of physical elements, abnormalities, or other conditions. These features or functionalities generally can allow for a more versatile use of the robot, while also enabling greater avoidance of physical elements that are obstacles with respect to the robot and that may impede the robot during work performance.

The robot can be autonomous, less than fully autonomous, or drive-assisted. The features, methods and teachings of the present disclosure can apply to drive-assisted operator-controlled vehicles, whether the operator may or may not be able to be located on the vehicle.

For residential or domestic robots, this feature is useful in that it is not always possible to schedule tasks during hours when humans or domestic animals are absent from a work area. For robots conducting tasks in non-domestic work areas, such as public work areas, it is not always possible to know when humans/pets may be passing through the public work area. In many instances, regardless of the work area, the robot may be working according to an automatic schedule and the user may not necessarily be at the work area/work site to ensure that the work area is clear from humans/pets.

Turning first to FIG. 1, one example of an outdoor power equipment machine, such as a domestic robot, configured to provide one or more of the above-mentioned features is depicted at 20. The machine 20 includes a body 22 supported by a chassis 23. A drive system 24 also is supported by the chassis 23 for moving the machine 20 about a work area. The drive system 24 includes one or more surface engaging movable members 26.

The illustrated surface engaging members 26 include three wheels or castors. A pair of oppositely disposed rear wheels 28 are controlled for rolling movement about a respective shared rolling axis 30 by a prime mover 32 of the drive system 24, such as a motor. A front wheel 34 is longitudinally spaced from the rear wheels 28 along a central longitudinal axis 35 of the machine 20. Movement of the front wheel 34 about a directional axis 36 is controlled by a suitable prime mover 38, such as a linear or rotary actuator or motor. The directional axis 36 generally is perpendicular to the respective rolling axis 30 of the rear wheels 28. Each of the prime movers 32 and 38 is powered by a joint power source 40, such as an electric battery.

In other embodiments, fewer or additional surface engaging members 26 can be used, which can include one or more of wheels, track systems, skis, etc. Any suitable number of the surface engaging members 26 can be driven for forward/reverse rotational movement and/or directional rotation for turning. A prime mover can be arranged to move any one or more of the surface engaging members 26. A power source can be arranged to supply any one or more of the prime movers. In other embodiments, any suitable number of surface engaging members 26 can be passive, driven, or switchable between passive and driven function.

To perform a work task, such as to modify a work area during movement of the machine 20, the machine 20 includes a working apparatus 42 which is moved by a separate prime mover 44 powered by the power source 40. The prime mover 44, depending on the working apparatus 42, can be a motor, actuator, cylinder, etc., and in some embodiments, can be omitted where the working apparatus 42 also is controlled by one of the prime movers 32 or 36.

The illustrated working apparatus 42 is a cutting mechanism having a rotatable blade 46 for cutting ground covering such as grasses or other plants. The illustrated machine 20 includes a pair of the bladed working apparatuses 42. Alternative or additional working apparatuses 42 can include one or more of a blade, vacuum, blower, fan, lifting member, sprayer for applying water or other chemical to a ground surface, etc.

A control system 60 is schematically disclosed in FIG. 1 connected to each of the prime movers 32, 36, and 44 and to the power source 40 for control of these components. The control system 60 includes the necessary hardware and software for controlling the drive system 24 in addition to controlling an environment detection system 62, also referred to as a scanning system, of the machine 20. The control system 60 and a charging circuit 70 electrically coupled to the control system 60 are each disposed within the body 22.

In some embodiments, separate control systems can be provided for any of the listed components (prime movers, power source(s), charging circuit, drive system, environment detection system). While the control system 60 is schematically illustrated as a central hub connecting other components, any of the components can be electrically or otherwise communicatively connected to one or more of the other components.

As shown, the control system 60 includes one or more processors as a central processing unit (CPU) 64 and storage/memory 66 associated with the CPU 64. The processors are, for example, conventional processors or microprocessors, such as those used in computers and other computerized devices. The storage/memory 66 can include any suitable architecture for storing various information to assist with the operation of the drive system 24 and the environment detection system 62. The storage/memory 66 can provide a non-transient computer readable medium for containing program instructions for causing the CPU 64 to perform one or more steps related to any one or more of navigation, charging and environment detection functions.

Figure 2:
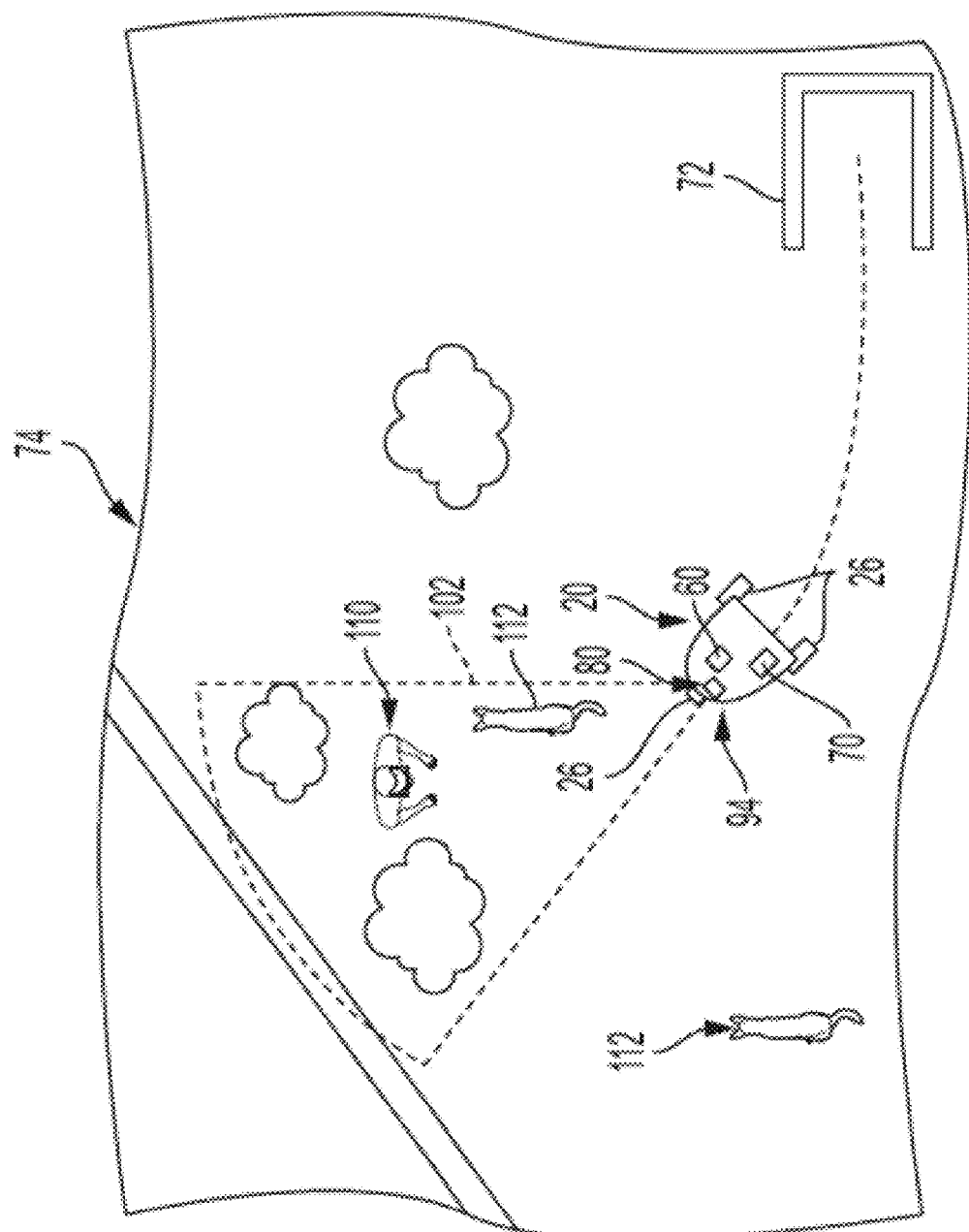
FIG. 2 is a schematic view of the mobile outdoor power equipment machine in an example work area.

Turning now to FIG. 2, in addition to FIG. 1, the charging circuit 70, controlled by the control system 60, is configured for connection to a charging station 72, shown in FIG. 2. The charging station 72 can serve as both a base or home location of the machine 20 when not performing work in the work area 74, and optionally as a charging location for the power source 40, which can be rechargeable. The charging station 72 can be located within or outside of the work area 74.

The work area 74 is shown as an owner's yard, but in other embodiments can be a field, a soccer pitch, a perimeter wire-bounded location, a portion of a golf course, etc. In some circumstances, animate beings, for example, a human 110 and/or dogs 112, can be present within the work area 74.

Structurally coupled to one of the body 22 or the chassis 23, and electrically coupled to the control system 60 is the environment detection system 62, which includes one or more sensing apparatuses 80 and a signal processing unit 82. As shown, the machine 20 includes a single sensing apparatus 80.

In some embodiments, each sensing apparatus 80 can include a dedicated signal processing unit 82 or a signal processing unit 82 can service two or more sensing apparatuses 80. In other embodiments, a processor of the control system 60 can provide signal processing functions and a separate signal processing unit can be omitted.

A sensing apparatus 80 can be a sensor or 2D or 3D camera that can take various forms. The sensor or camera can be configured to receive one or more of light waves, radio waves, IR or other EM radiation, or ultrasound waves. Using received signals, the machine 20 is configured to recognize a physical element of the work area 74, such as an object to avoid, and such as via detected movement, thermal production, reflectivity, moisture content, contrast to surroundings, shape, size, etc.

In some embodiments, the environment detection system 62 can be configured to passively receive data from the work area 74. In other embodiments, the environment detection system 62 can actively transmit energy into the work area 74 with the intent of a sensing apparatus 80 receiving reflected portions of the transmitted energy, such as in the case of inclusion of a laser generator. In some embodiments, a light source of visible light or other wavelengths can be used in combination with the sensing apparatus 80.

One or more sensing apparatuses 80 can be provided to function individually, or in groups or arrays, such as regularly-spaced arrays. For example, a camera can be considered as providing an array of regularly-spaced visible light sensors, an infra-red camera can be considered as providing an array of regularly-spaced infra-red sensors, or a LIDAR system can include an array of physical pixels.

The signal processing unit 82 generally is configured to convert the light, sound, or other energy signals received into electrical signals for analysis. More specifically, the signal processing unit 82 includes one or more electronic components, such as a processor, or microprocessor, etc. for providing the conversion of received signals to electrical signals. Additional electrical architecture can be provided at the signal processing unit 82 for amplification, filtering, or digitization of the converted electronic signals.

In some embodiments, the environment detection system 62 can be configured for continuous sensing or scanning of the work area 74, such as during time away from the charging station 72. In other embodiments, the environment detection system 62 can be configured for intermittent signal processing or signal processing during a preset time period, which can be set by a user. The processing speed can be lowered or increased, such as during use of the working apparatus 42, during a preset time period, or in response to a recognized sound stimulus, e.g., a noise recognized as being from an animate being.

As used herein, the term "animate being" refers to a living animal, which can include a human or other animal, such as a dog, cat, bird, etc. The animate being is not fixed to the work area 74, such as via roots, rhizomes, etc., as in the case of plants.

Looking still to FIGS. 1 and 2, the depicted sensing apparatus 80 is a 2D camera configured for receiving signals, such as light signals from the working area 74. The signal processing unit 82 onboard the machine 20 is configured to process the received signals, converting the signals to electrical data for analysis by the control system 60. Another processing unit, such as part of the control system 60, can be used for processing in other embodiments. A set of computer-readable instructions 90 stored at the memory 66 are processed by the CPU 64 for causing analysis of the converted signals for purposes of detecting one or more physical elements within the work area 74 to be avoided by the machine 20 during its navigation within the working area 74.

The depicted sensing apparatus 80 can be movably coupled to the body 22 and/or the chassis 23 to allow for movement of the sensing apparatus 80 relative to the body 22 and/or the chassis 23. For example, a prime mover, such as a rotary motor, can engage and rotate the camera 80 where pivotably coupled relative to the body 22 and/or chassis 23. In other embodiments, the sensing apparatus 80 can be fixed relative to the body 22 and/or the chassis 23, and instead movement of the machine 20 can allow for varied fields of signal intake by the sensing apparatus 80.

The depicted sensing apparatus 80 is arranged as a forward-sensing apparatus of the machine 20, for purposes of scanning the work area 74 at a front side 94 of the machine 20, adjacent the front wheel 34. In other embodiments, the sensing apparatus 80 can be otherwise positioned, one or more additional sensing apparatuses 80 can be included for scanning portions of the work area 74 at other sides of the machine 20, and/or the sensing apparatus 80 can be coupled to the body 22 or chassis 23 for movement relative to the body 22 or chassis 23 to receive signals from additional sides of the machine 20.

The depicted sensing apparatus 80 includes a lens disposed in a housing of the sensing apparatus 80 such that a field of view/signal receipt 102 of the sensing apparatus 80 is angularly limited, such as to avoid signal saturation of the sensing apparatus 80.

Figure 3:
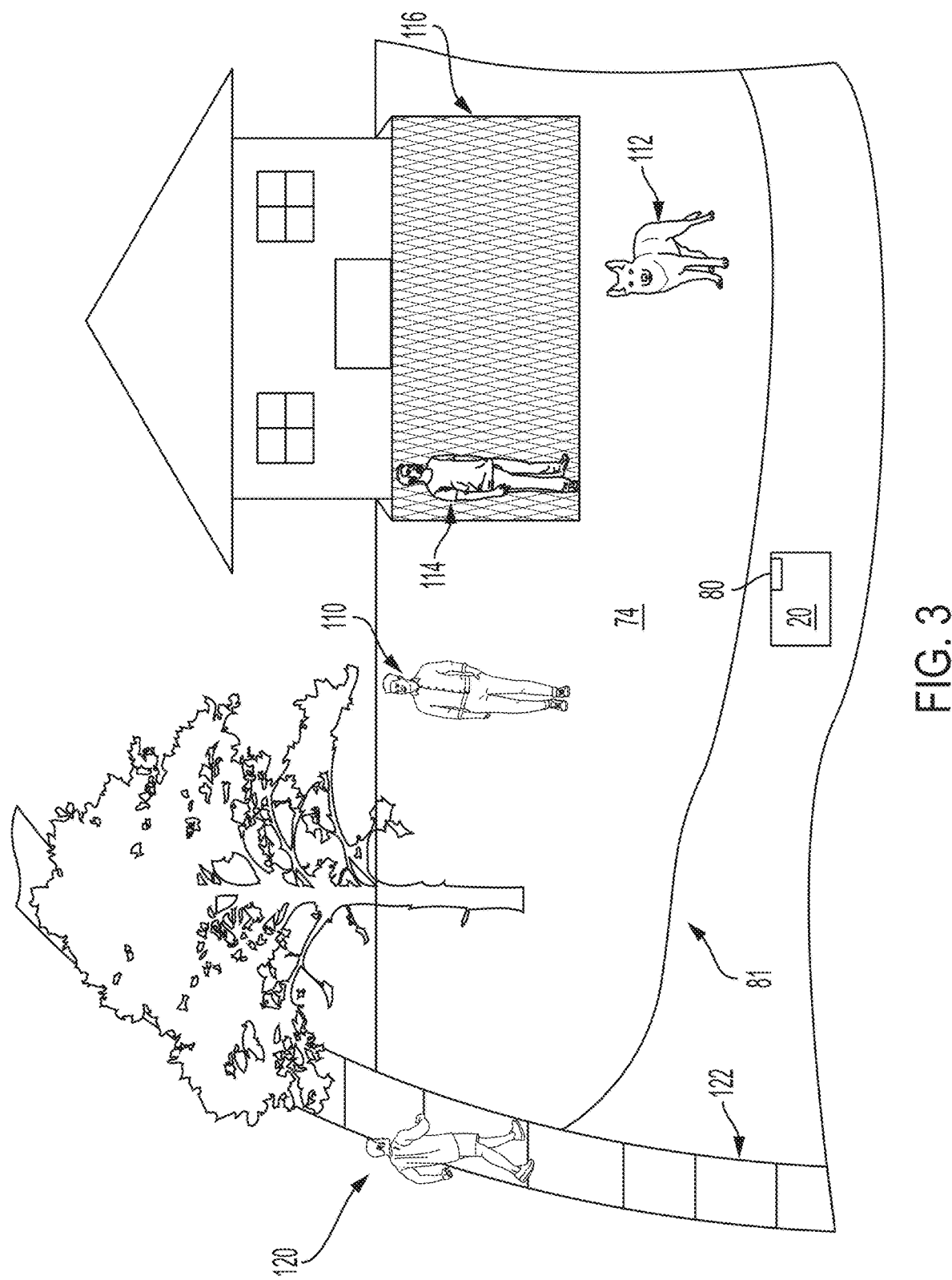
FIG. 3 is a schematic view of an example work area, from the perspective of a sensing apparatus of the mobile outdoor power equipment machine.

Turning now to FIG. 3, a view 81 of the work area 74 is shown from the perspective of the sensing apparatus 80 of the mobile outdoor power equipment machine 20. The work area 74 within the present field of signal receipt 102 includes at least the four depicted physical elements—a first tree, a second tree, and a pair of animate beings 110 and 112, where a human 110 is a first of the animate beings and a dog 112 is a second of the animate beings. The machine 20 is configured to recognize the animate beings 110 and 112 as animate beings and to conduct a behavior in response to the recognition.

In an embodiment, the machine 20 is configured to recognize animate beings 114, 120 which are within its field of view 81 and are near or adjacent to the work area 74, but are located outside the work area. When the work area 74 comprises a grass covered area, such as a lawn, a determination can be made of whether the physical presence is located on the lawn rather than on a deck 116, patio, driveway, sidewalk 122, walkway, or other area near the work area 74, but not within the work area 74.

As set forth in more detail in connection with method 400 below, various approaches can be employed to determine whether an identified animate being is within the work area 74. The machine 20 can be configured to recognize the animate beings 110, 112, 114, 120, and their locations relative to work area, and to conduct a behavior in response to the recognition. The behavior conducted can be different upon recognition of an animate being 110 and 112 located with the work area 74, as compared with the behavior conducted upon recognition of an animate being 114 and 120 located outside the work area.

Figure 4:
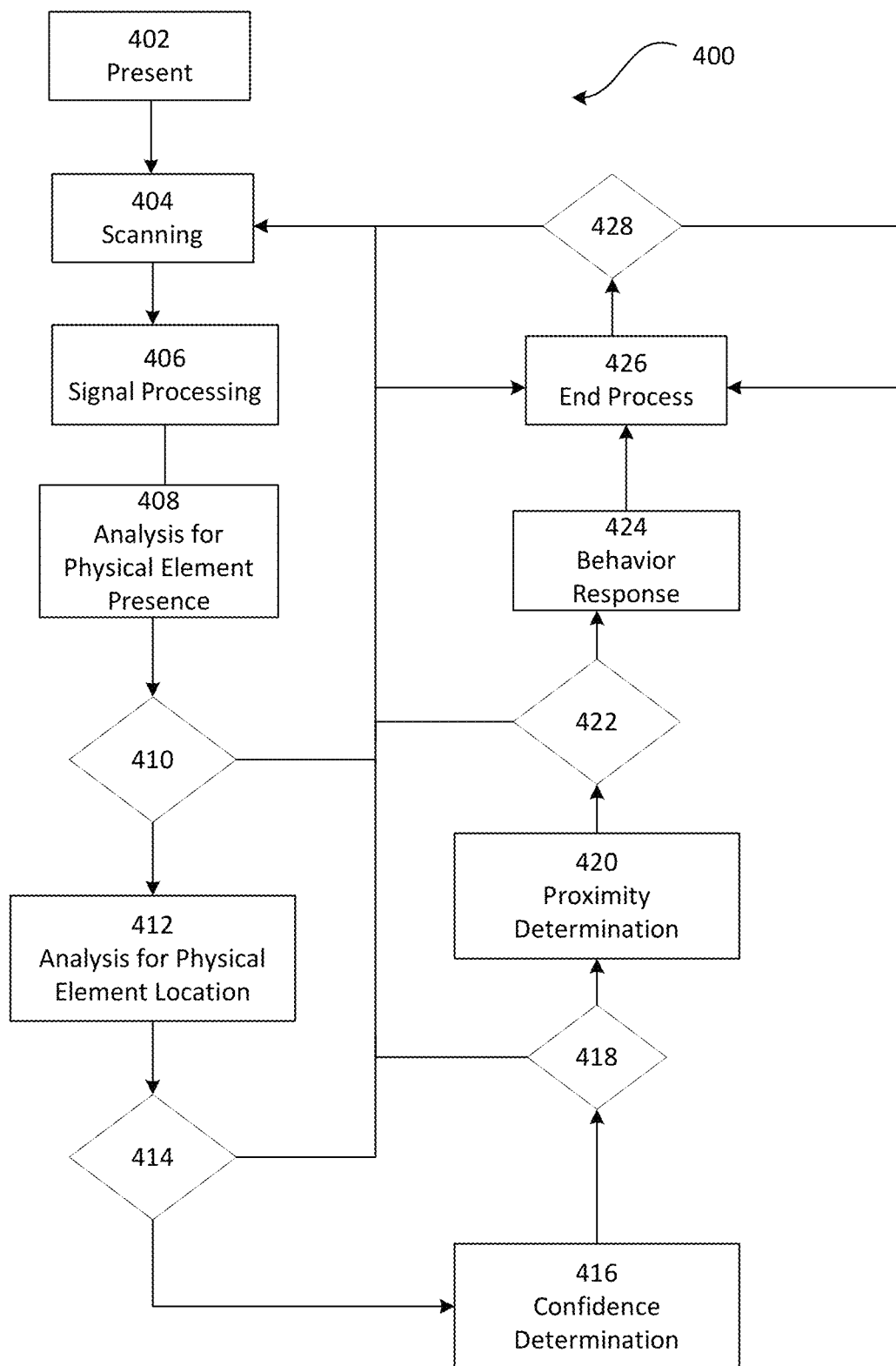
FIG. 4 is a flow diagram of a method by which the mobile outdoor power equipment machine detects the presence of a physical element in the work area shown in FIG. 3.

With reference to the representation of the work area 74 depicted in FIG. 3, FIG. 4 provides a schematic illustration of one example method 400 of presence detection of one or more physical elements of an area surrounding a mobile outdoor power equipment machine, such as the work area 74 about the machine 20. The method is a step-based illustration of one set of instructions 90 that can be stored at the memory 66. The method is applicable to analysis both while the machine 20 is mobile or stationary.

The method 400 is illustrated as a series of acts. However, the method is not limited by the order of the acts, as some acts can occur in different orders or concurrently with other acts from that shown or described, such as in parallel or in series with other acts. Moreover, less than all of the illustrated acts can be required to implement an example methodology. Furthermore, other methodologies can employ additional or alternative, non-illustrated acts.

At act 402, the mobile outdoor power equipment machine 20 is indicated as being disposed in the work area 74 or moving along a path towards and into the work area 74. For example, the machine 20 can exit the charging station 72, which is already disposed in the work area 74. In other embodiments, the method 400 can be run without regard to a location of the machine 20 relative to a work area 74.

At act 404, the sensing apparatus 80 scans at least a portion of the work area 74 surrounding the mobile outdoor power equipment machine 20. Particularly, the sensing apparatus 80 scans the field of signal receipt 102. As used herein, scanning refers to the allowance of receipt of signals and/or the storage of data related to received signals.

Where the sensing apparatus 80 is movable relative to the body 22 or chassis 23, a wider field of signal receipt 102 can be obtained by moving, such as rotating, the sensing apparatus 80. Whether or not the sensing apparatus 80 is movable in this manner, the scanning of a portion of the work area 74 in a path of the machine 20 through the work area 74 allows for obstacle avoidance along the path. In the case of the sensing apparatus 20 being a 2D camera, light signals are received at the sensing apparatus 80.

In some method embodiments, a scanned field of signal receipt can be varied at different instances of running of at least act 404, for example switching between adjacent fields 102.

Advancing to act 406, the signals received at the sensing apparatus 80 are transmitted to the signal processing unit 82. The signal processing unit 82 is configured, via the processor, or microprocessor disposed therein, to convert the received signals into electrical signals for further processing and analysis by the control system 60.

At act 408, the converted electrical signals/data are analyzed by the control system 60 for determination of presence of a physical element in the work area 74. For example, the memory storage 66 can include additional programs or algorithms executable by the CPU 64 for data analysis for the purpose of identifying the presence of a physical element in the work area 74, and particularly along or adjacent a predefined path of the machine 20 through the work area 74. The analysis can include, for example, edge detection, corner detection, blob detection, silhouette detection, face detection, facial feature detection, etc.

In other embodiments, the analysis can additionally or alternatively include analyzing the converted data for a particular area of moisture, reflectivity, movement, etc., or alternatively can include generating an image of at least a portion of the work area 74. The image can be of the work area, a physical aspect of the work area, etc. The image itself then can be analyzed via any of the aforementioned methods, programs, etc.

At decision act 410, where a physical element has been identified, the method can advance to act 412, where the converted electrical signals/data are analyzed by the control system 60 for determination of a location of the physical element relative to the work area 74. Where the physical element is indicated as not being within the work area 74, the method can advance to step 426 ending the method 400 until the instructions are re-run, such as every predefined unit of time, such as about every tenth of a second to about every second, or about every half of a second. In other embodiments, the method 400 can be set to continue to run at decision act 428, returning to act 404 for continued scanning, such as while the machine 20 is in motion or away from the charging station.

At act 412 the converted electrical signals/data are analyzed by the control system 60 for determination of a location of the physical element relative to the work area 74. For example, the memory storage 66 can include additional programs or algorithms executable by the CPU 64 for data analysis of the areas adjacent to or surrounding the identified physical element. When the work area 74 comprises a grass covered area, such as a lawn, a determination can be made of whether the physical presence is located on the lawn rather than on a deck 116, patio, driveway, sidewalk 122, walkway, or other area near the work area 74, but not within the work area 74.

Various approaches can be employed to determine whether the areas adjacent to or surrounding the identified physical element are grass covered. For example, parameters of the converted electrical signals/data can be compared with parameters known to identify grass, and adjacent areas can be classified as grass when the data meets the structural parameters indicative of grass. Other materials call be identified accordingly, e.g., wood, cement, concrete, asphalt, stone, or gravel.

In other embodiments, the sensing apparatuses 80 of the mobile outdoor power equipment machine 20 can include sensors for chlorophyll detection, such as a tube that emits light from a light-emitting diode (LED) at a specific wavelength, and means for measuring the reflected light.

Thus, in an embodiment, when the areas adjacent to or surrounding the identified physical element are determined to be grass, the physical element is considered to be within the work area 74. When the areas adjacent to the physical element are determined to be other than grass, e.g., wood, cement, concrete, asphalt, stone, gravel, or other, the physical element is considered not to be within the work area 74.

In further embodiments, the method can include determining that the physical element is located within the work area 74 based on a location of the mobile outdoor power equipment machine relative to the work area 74, and the proximity of the physical element to the mobile outdoor power equipment machine 20. In some embodiments, the work area 74 is defined by a boundary wire arranged around the perimeter of the work area 74, and movement of the mobile outdoor power equipment machine 20 is controlled utilizing a demarcation, or other localization or navigation system. The wire separates the work area 74, lying within the perimeter defined by the wire, from a non-work area, which lies outside of the perimeter defined by the wire.

Data associated with the position and/or orientation of the mobile outdoor power equipment machine 20 is provided by the localization system, and can be utilized to estimate the distance from mobile outdoor power equipment machine 20 to the wire. The distance from the mobile outdoor power equipment machine 20 to the physical element can be determined employing methods such those utilized in the proximity determination at act 420. Taking into consideration the distance to the boundary wire, and the proximity of the physical presence, a determination of whether the physical presence is within the work area 74 is made.

In other embodiments, a localization system associated with the mobile outdoor power equipment machine 20 includes a virtual perimeter or geofence, utilizing for example, global positioning (GPS), or radio frequency identification (RFID), to define the geographic boundary of the work area 74. A determination of whether the physical presence is within the work area 74 can be made based on data associated with the position of the mobile outdoor power equipment machine 20 within the virtual boundary, together with the proximity of the physical presence, and the relative angle of its position to the mobile outdoor power equipment machine 20.

At decision act 414, where a physical element is indicated as being identified as being located within the work area, the method can advance to a confidence determination act 416. At act 416, a confidence level or probability of whether the physical element is an animate being is determined. The determination can include additional identification processes, including, but not limited to, silhouette detection, face detection, facial feature detection, movement detection, etc. Alternatively, or additionally, the control system 60 can be trained to recognize body parts, such as at various orientations, such as using a deep neural network that is specifically trained for humans and animals such as pets.

A determination algorithm can take account of user-provided information. An example of the user supplied information can be a facial picture of one or more humans or animals that frequent the work area 74, location of trees, structures, toys, etc. The information can be supplied at a user-input interface on the charging station 72 or on the machine 20, on a user's computer or hand-held electronic device, or on a remote configured for use with the machine 20. At decision act 418, where a predetermined confidence threshold is met and/or 20 exceeded, the method 400 advances to a proximity determination act 420. Where the predetermined confidence threshold is not met and/or not exceeded, the method 400 advances to end act 426 until the instructions are re-run, such as every predefined unit of time, such as about every tenth of a second to about every second, or about every half of a second, or alternatively to act 404 in other embodiments.

The threshold can be most any suitable confidence level, such as equal to or greater than 30 percent, or equal to or greater than 40 percent, or equal to or greater than 50 percent. At act 420, a proximity of the possible animate being to the machine 20 is determined, such as via calculation. In some embodiments, data from signals received can be utilized to determine the proximity, such as being the least linear distance between the possible animate being and the machine 20.

Additionally, or alternatively, the machine 20 can include (a) a GPS or other satellite navigation system receiver or other local positioning sensor, or (b) a relative motion sensor for directly sensing any of the speed, acceleration, or angular velocity of the machine 20. Data from such sensor can be utilized for determination of the aforementioned proximity.

Depending on one or more varying thresholds or ranges of proximity, the method 400 can call for the control system 60 to trigger a modified behavior of the machine 20. At decision act 422, where the threshold is reached, the method 400 advances to one or more behaviors represented by response act 424. In the case of a proximity range, the range can include either upper or lower boundary as being included in the respective range.

Act 420 can continue to be run until the proximity threshold or range is no longer reached/met/exceeded, such as by movement of one of the physical element or machine 20

At the depicted behavior response act 424, the control system 60 is configured to transmit a response signal to one or more components of the machine 20, and/or to a predetermined user, causing a reaction based on the processed information. In an embodiment, a response signal is transmitted to the machine 20, and one or more behaviors of the machine 20 are controlled based on, for example, a respective proximity of the animate being to the machine 20.

The controlled/directed behaviors can include (i) changing the machine speed, such as slowing the machine 20, such as by slowing a prime mover 32; (ii) stopping the machine 20 temporarily; (iii) stopping the machine 20 until reactivated by a user, such as manually or electronically via a transmitted signal; (iv) altering a path or route of the machine 20; (v) returning the machine 20 to the charging station 72; (vi) deactivating the working apparatus 42, such as until the proximity threshold or range is no longer reached/met/exceeded; (vii) request user permission to continue running of the working apparatus 42 and/or motion of the machine 20; (viii) provide a visual warning to a visual display 150 (FIG. 1) of the machine 20, such as electrically coupled to the control system 60; and (ix) provide a visual and/or audible warning via a visual and/or audible warning system 152 (FIG. 1) of the machine 20, such as electrically coupled to the control system 60.

The visual display 150 can otherwise be configured to display the portion of the work area 74 being scanned.

With respect to the visual and/or audible warning system 152, a visual warning can include one or more flashing lights or moving components for alerting a human or animal of a nearby machine 20. An audible warning can include an alarm, spoken or non-spoken warning, for example. The alarm may be an audible alarm such as playing a sound through a speaker, a visible alarm in the form of lighting lights such as LED lights which may be placed on most any surface of the machine 20, the transmission of a signal to a remote entity through a remote user data interface, or any combination of these alarms.

A response to the predetermined user can be sent by any suitable wired or wireless connection, such as Bluetooth, Zigbee, cellular, Wi-Fi, token ring, or the like. The response can be received at an email, a mobile application, etc.

Subsequent to the proximity range or threshold no longer being at issue, the method 400 can advance to the end act 426. At the decision act 428, the control system 60 makes the decision to maintain the ending of the process or to return to act 404 for continued running of the method 400, such as based on predetermined criteria, or such as a continued proximity warning, where the proximity determination step 420 continues to run in the background.

Figure 5:
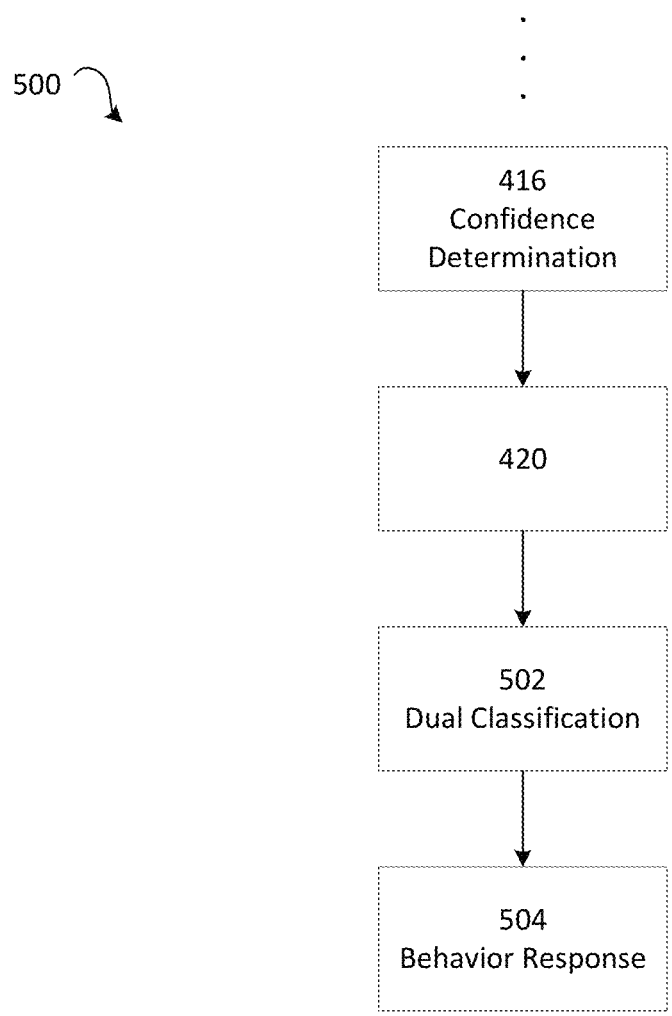
FIG. 5 is a flow diagram of a partial method by which the mobile outdoor power equipment machine detects the presence of a physical element in the work area shown in FIG. 3.

Turning next to FIG. 5, in some embodiments, a modified method 500 can advance from act 416 to 420 regardless of the confidence level determined. Thus, a decision act 418 can be omitted. Once each of confidence level and proximity are determined, the method 500 can advance to a next varying decision act 502 (instead of to act 424) for determining a dual classification of the confidence level determined at act 416, and the proximity determined at act 420. In response, at act 504, depending on the dual classification, varying response signals can be transmitted by the control system 60, similar to the act 424 of method 400.

For example, at least two different behaviors can be triggered by the control system 60 for directing a respective behavior of the machine 20 in response to two different respective dual classifications. For instance, one confidence level and proximity can result in the control system 60 slowing the prime mover 32, slowing forward motion of the machine 20. Another and different classification including at least one of a different confidence level or a different proximity can result in the control system 60 both slowing the prime mover 32, and also triggering a visual or audible warning. The dual classification can include threshold values for either of confidence level and proximity, and/or can include a range for either of confidence level and proximity, where the range can include either upper or lower boundary as being included in the respective range.

Figure 6:
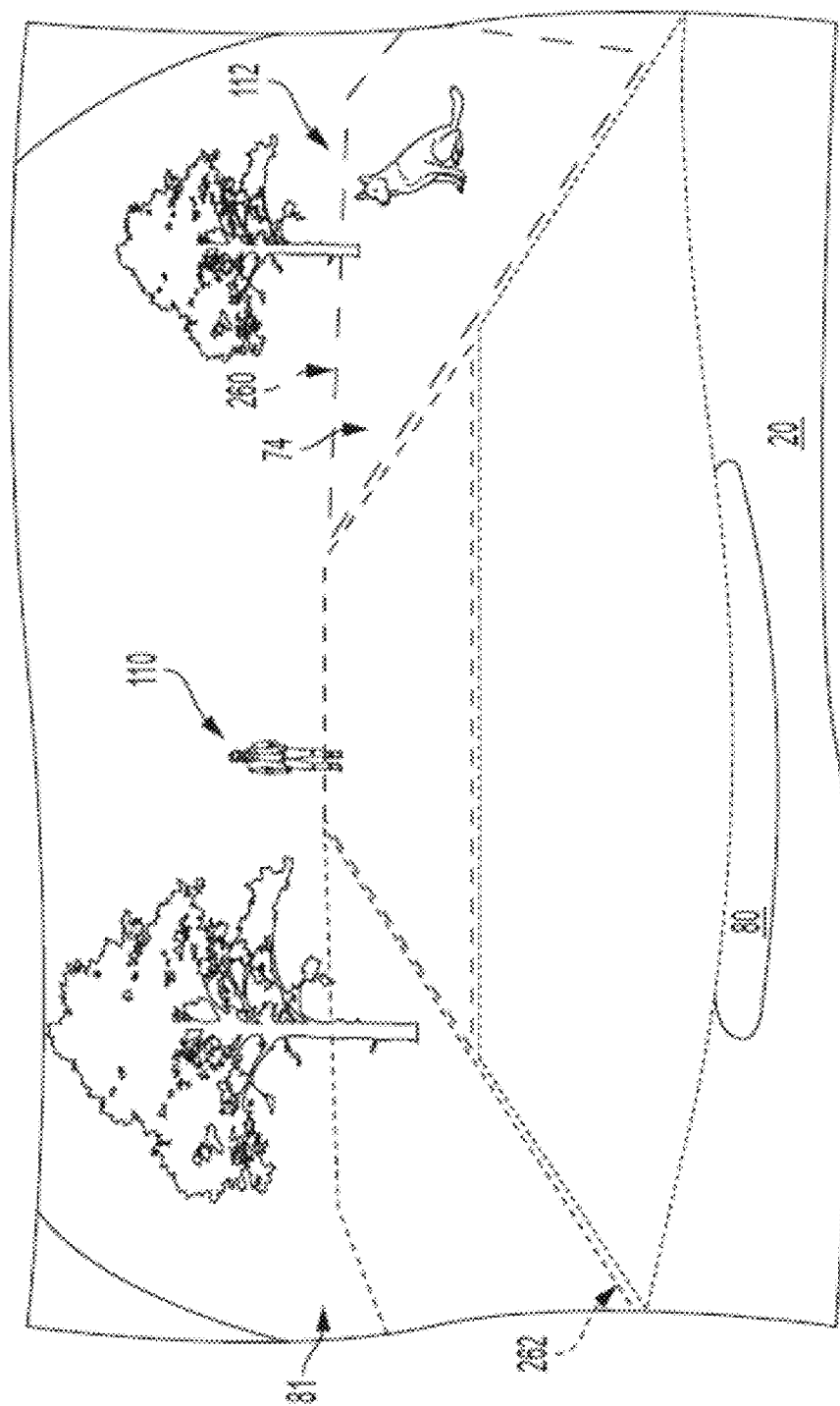
FIG. 6 is a schematic view of an example work area, from the perspective of a sensing apparatus of the mobile outdoor power equipment machine.

Referring next to FIG. 6, another view 81 of the work area 74 is shown from the perspective of the sensing apparatus 80 of the mobile outdoor power equipment machine 20, including a sectioned grid 262 applied to the field of signal receipt 102. As in FIG. 3, the work area 74 within the present field of signal receipt 102 includes at least the four depicted physical elements—a first tree, a second tree, and a pair of animate beings 110 and 112, where a human 110 is a first of the animate beings and a dog 112 is a second of the animate beings. The machine 20 is configured to recognize the animate beings 110 and 112 as animate beings and to conduct a behavior in response to the recognition.

A predefined measured area 260 about the machine 20 is visually displayed for purposes of this disclosure, although a visual representation of the digital sectioning 262 may not be displayed/rendered by the control system 60 for view by the user.

Figure 7:
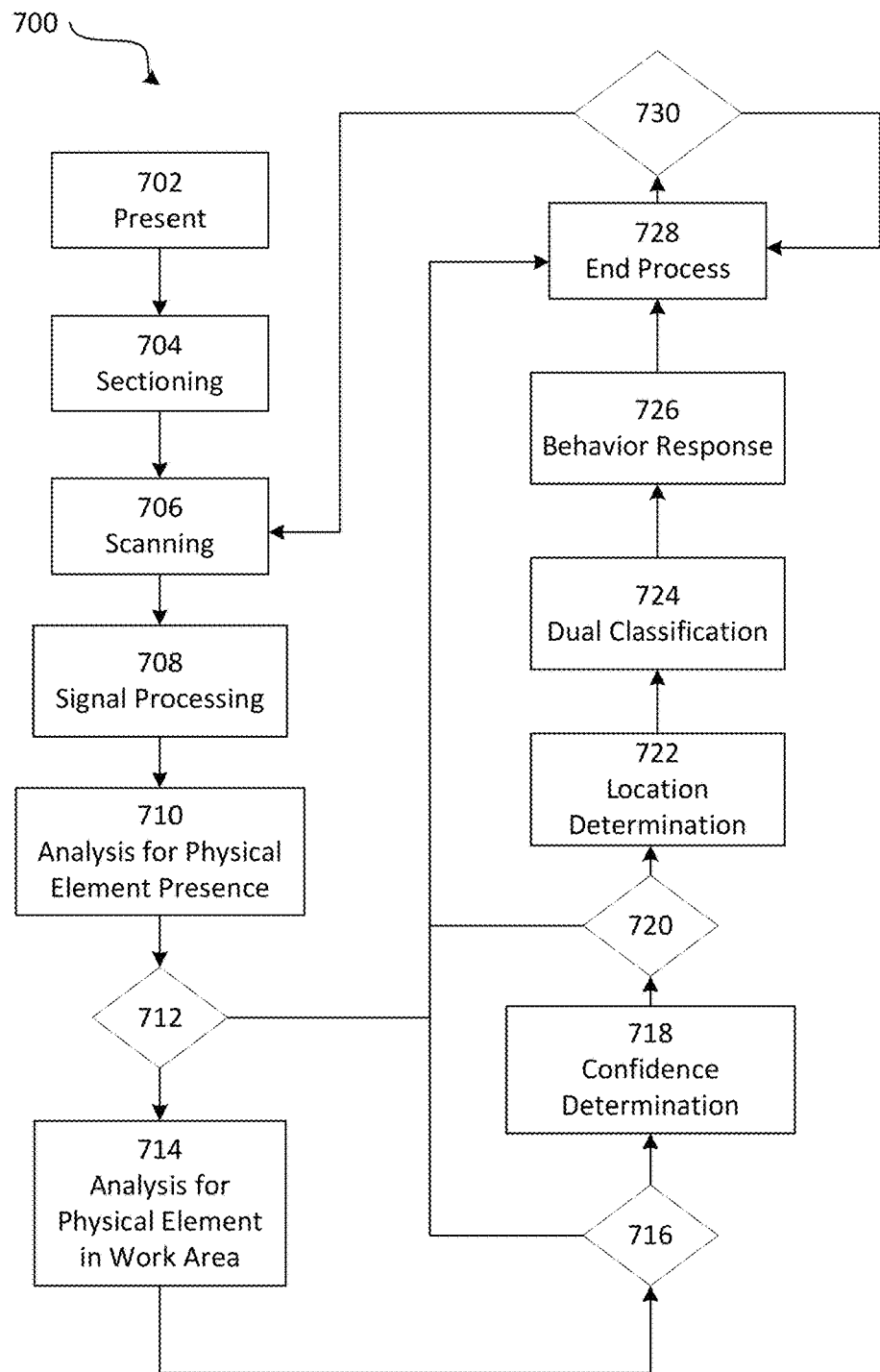
FIG. 7 is a flow diagram of an example method by which the mobile outdoor power equipment machine detects the presence of a physical element in the work area shown in FIG. 6.

With reference to the representation of the work area 74 depicted in FIG. 6, FIG. 7 provides a schematic illustration of another example method 700 of presence detection of one or more physical elements of an area surrounding a mobile outdoor power equipment machine, such as the work area 74 about the machine 20. The method is a step-based illustration of one set of instructions 90 that can be stored at the memory 66. In an embodiment, the method is applicable to analysis while the machine 20 is mobile, and/or while the machine 20 is stationary The method 700 is illustrated as a series of acts. However, the methodologies are not limited by the order of the acts, as some acts can occur in different orders or concurrently with other acts from that shown or described, such as in parallel or in series with other acts. Moreover, less than all of the illustrated acts can be required to implement an example methodology. Furthermore, other methodologies can employ additional or alternative, non-illustrated acts.

Method 700 is substantially similar to method 400, except as noted below. Discussion with respect to method 400 regarding additional, alternative and other embodiments applies to method 700 unless otherwise indicated.

At act 702, the mobile outdoor power equipment machine 20 is indicated as being disposed in the work area 74 or moving along a path towards and into the work area 74. For example, the machine 20 can exit the charging station 72, which is already disposed in the work area 74. In other embodiments, the method 700 can be run without regard to a location of the machine 20 relative to a work area 74.

Figure 8:
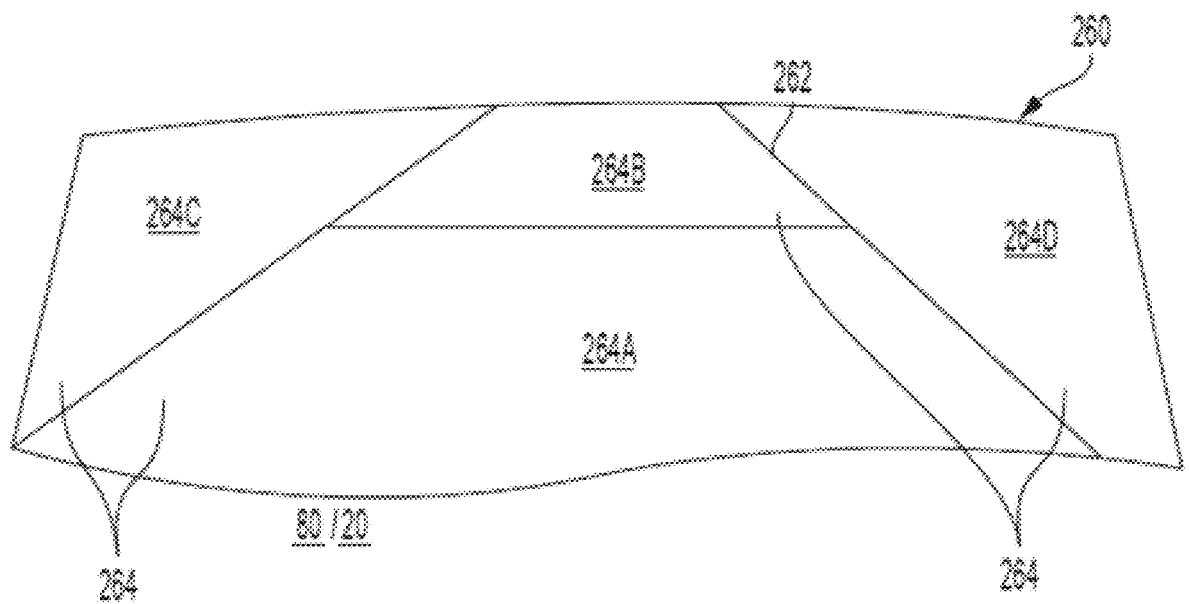
FIG. 8 is a visual representation of a sectioning step of the method represented in FIG. 7.

Turning briefly to FIG. 8, in addition to FIG. 7, at act 704, a predefine measured area 260 about the machine 20 is visually displayed for purposes of this disclosure, although a visual representation of the digital sectioning 262 may not be displayed/rendered by the control system 60 for view by the user. For example, in some embodiments, the visual display 150 of the machine 20 may display the sectioning 262 applied to a portion of the work area 74 being scanned. In other embodiments, the digital sectioning 262 can be fully digitally applied without an image of the sectioning 262 being rendered.

The predefined measured area 260 is a digital area which can be defined by the user or by the control system 60. For example, the predefined measured area 260 can represent an area having the boundary dimensions of the portion of the work area 74 to be scanned by the sensing apparatus 80. The predefined measured area 260 can be larger than the area to be scanned, for instance.

The depicted measured/sectioned area 260 is digitally fixed relative to an available field of the sensing apparatus 80, such as fixed to overlap the field of signal receipt 102 (see, e.g., FIG. 6). In this way, the measured area 260 translates with movement of the sensing apparatus 80, either with or separate from a remainder of the machine 20.

In other embodiments, the measured area can be fixed relative to a predesignated side of the machine 20, such as the forward or a front side 94 of the machine 20, where the front wheel 34 is disposed. In such way, the measured area 260 translates with the machine 20.

A shown, the predefined measured area 260 can be digitally sectioned into interconnected sections, for example, 264a, 264b, 264c, 264d, of varying numerical areas. In an embodiment, each section 264 has a polygonal shape with some sections 264 being disposed closer to machine 20 than others. Each of the sections 264 shares a boundary with at least one other section 264 to minimize non-sectioned areas to which specific limitations are applied by the control system 60, as will be further described.

In other embodiments, less than the full predefined area can be sectioned, sections of equal area, and/or non-interconnected sections can be included. For example, dimensional tolerances between polygonal edges can allow for minimal overlap or spacing between sections 264.

The digitally sectioned area 260 as a whole represents a planar area for being laid atop an actual topography of the environment. For example, referring again to FIGS. 6 and 7, for purpose of demonstration of the function of the control system 60, the digital sectioning 262 is applied to the work area 74. At least a portion of, and particularly the majority or all of, the scanned area represented by the field of signal receipt 102 is overlaid by the digital sectioning 262 of the sectioned area 260. In this way, analysis depending on the location of physical aspects of the work area 74 within the different sections 264a, 264b, 264c, 264d can be made.

The predefined measured area 260 depicted in FIG. 6 is shaped as a circular sector and is bounded by the boundaries of the field of signal receipt 102 to allow for predefined responses depending on disposition of physical aspects in the sections 264. In different embodiments, the measured area 260 can be otherwise suitably shaped.

At act 706, the sensing apparatus 80 scans at least a portion of the work area 74 surrounding the mobile outdoor power equipment machine 20. Particularly, the sensing apparatus 80 scans the field of signal receipt 102. As used herein, scanning refers to the allowance of receipt of signals and/or the storage of data related to signals received.

Advancing to act 708, the signals received at the sensing apparatus 80 are transmitted to the signal processing unit 82. The signal processing unit 82 is configured, via the processor, or microprocessor disposed therein to convert the received signals into electrical signals for further processing and analysis by the control system 60.

At act 710, the converted electrical signals/data are analyzed by the control system 60. For example, the memory storage 66 can include additional programs executable by the CPU 64 for data analysis for the purpose of identifying the presence of a physical element in the work area 74, and particularly along or adjacent a predefined path of the machine 20 through the work area 74. The analysis can include edge detection, corner detection, blob detection, silhouette detection, face detection, facial feature detection, etc.

In other embodiments, the analysis can additionally or alternatively include analyzing the converted data for a particular area of moisture, reflectivity, movement, etc., or alternatively can include generating an image of at least a portion of the work area 74. The image can be of the work area, a physical aspect of the work area, etc. The image itself then can be analyzed via any of the aforementioned methods, programs, etc.

At decision act 712, where a physical element is indicated as being identified, the method can advance to act 714 for determination of a location of the physical element relative to the work area 74. At act 714 the converted electrical signals/data are analyzed by the control system 60 for determination of a location of the physical element relative to the work area 74. The determination termination of a location of the physical element relative to the work area 74 can be accomplished as described in detail in connection with act 412 of method 400 supra.

At decision act 716, where a physical element is indicated as being located within the work area, the method can advance to a confidence determination act 718. Where the physical element is indicated as not being within the work area, the method can advance to step 728 ending the method 700 until the instructions are re-run, such as every predefined unit of time, such as about every tenth of a second to about every second, or about every half of a second. In other embodiments, the method 700 can be set to continue to run at decision act 730, returning to act 706 for continued scanning, such as while the machine 20 is in motion or away from the charging station.

At act 718, a confidence level or probability of whether the physical element is an animate being is determined. The determination can include additional identification processes, including, but not limited to, silhouette detection, face detection, facial feature detection, movement detection, etc. Alternatively, or additionally, the control system 60 can be trained to recognize body parts, such as at various orientations, utilizing for example, a deep neural network that is specifically trained for humans and animals such as pets.

At decision act 720, where a predetermined confidence threshold is met and/or exceeded, the method 700 advances to a location determination act 722. Where the predetermined confidence threshold is not met and/or not exceeded, the method 700 advances to end act 728 until the instructions are re-run, such as every predefined unit of time, such as about every tenth of a second to about every second, or about every half of a second, or alternatively to act 706 in other embodiments.

The threshold can be any suitable confidence level, such as equal to or greater than 30 percent, or equal to or greater than 40 percent, or equal to or greater than 50 percent.

At act 722, a location of the possible animate being within the sectioning 262 and thus relative to the machine 20 is determined, such as via calculation. In some embodiments, data from signals received can be utilized to determine the location.

Additionally, or alternatively, the machine 20 can include (a) a GPS or other satellite navigation system receiver or other local positioning sensor, or (b) a relative motion sensor for directly sensing any of the speed, acceleration, or angular velocity of the machine 20. Data from such sensor can be utilized for determination of the aforementioned proximity.

Depending on the location of a physical element within the sectioning 262, the method 700 can advance to one or more differing behaviors represented at act 726.

Act 722 can continue to be run until the physical element is no longer within one or more particular sections 264, whether by movement of the machine 20 or movement of the physical element itself.

At act 724, the control system is configured to determine a dual classification of the confidence level determined at act 718 and the location, such as the nearest section 264 to the machine 20, determined at act 722. An indication can be made that the physical element is within the section 264, even if only a part of the physical element is disposed in that section 264.

At the depicted behavior response act 726, the control system 60 is configured to transmit a response signal to one or more components of the machine 20, and/or to a predetermined user, causing an action based on the processed information. Varying response signals can be transmitted by the control system 60 depending on the respective dual classification. A response to the predetermined user can be sent by any suitable wired or wireless connection, such as Bluetooth, Zigbee, cellular, Wi-Fi, or the like. The response can be received at an email, a mobile application, etc. Where a response signal is transmitted to the machine 20, one or more behaviors of the machine 20 can be controlled depending on the determined dual classification.

The controlled/directed behaviors can include (i) changing the machine speed, such as slowing the machine 20, such as by slowing a prime mover 32; (ii) stopping the machine 20 temporarily; (iii) stopping the machine 20 until reactivated by a user, such as manually or electronically via a transmitted signal; (iv) altering a path or route of the machine 20; (v) returning the machine 20 to the charging station 72; (vi) deactivate the working apparatus 42, such as until the proximity threshold or range is no longer reached/met/exceeded; (vii) request user permission to continue running of the working apparatus 42 and/or motion of the machine 20; (viii) provide a visual warning to the visual display 150 of the machine 20, such as electrically coupled to the control system 60; and (ix) provide a visual and/or audible warning via the visual and/or audible/auditory warning system 152 of the machine 20, such as electrically coupled to the control system 60.

At least two different behaviors or combined behaviors can be triggered by the control system 60 in response to two different respective dual classifications. For instance, one confidence level and proximity can result in the control system 60 slowing the prime mover 32, slowing forward motion of the machine 20. Another and different classification including at least one of a different confidence level or a different proximity can result in the control system 60 both slowing the prime mover 32 and also triggering a visual or audible warning. The dual classification can include a threshold value for confidence level or can include a range for confidence level where the range can include either upper or lower boundary as being included in the respective range.

For example, a human detection or animate being detection of more than 50% within the section 264B within the immediate pathway of the machine 20 can trigger the control system 60 to control the machine 20 to stop and wait, stop the working mechanism 42, and alert the user via a wirelessly transmitted message. Another example is an alert for presence in the sections 264C or 264D, which are not in the immediate pathway of the machine 20.

The control system 60 can control the visual/audible warning system to provide a warning, but allow for continued working and advancement of the machine 20.

Subsequent to the proximity range or threshold no longer being at issue, the method 700 can advance to the end act 728. At the decision act 730, the control system 60 makes the decision to maintain the ending of the process or to return to act 706 for continued running of the method 700, such as based on predetermined criteria, or such as a continued proximity warning, where the location determination step 722 continues to run in the background.

Turning now to additional environmental detection features of the machine 20, the environment detection system 62 and the control system 60 can be configured for feature classification and mapping.

As mentioned above, the control system 60 can be trained to recognize body parts, such as at various orientations, such as using a deep neural network that is specifically trained for humans and animals such as pets. A determination algorithm can take into account user-provided information. An example of the user supplied information can be a facial picture of one or more humans or animals that frequent the work area 74, location of trees, structures, toys, etc. The information can be supplied at a user-input interface on the charging station 72 or on the machine 20, on a user's computer or hand-held electronic device, or on a remote configured for use with the machine 20. This information can be in addition to or in alternative to use of a facial recognition technique, or other biometric detection methods.

In addition, for use in a navigation and/or work mode, the ability to detect humans near the machine 20 can provide a security use to the user, allowing the control system to recognize a non-user and shut down the machine or send a message to the user to deter or aid in preventing theft or unintended alterations to the machine 20 or control system 60.

Further, the ability to classify some elements within the field of signal receipt 102 can enable additional functional features. For example, the system 60 can be trained to detect abnormalities in a work area ground surface, such as a lawn, such as dry spots, sick spots, or weeds. At detection of such events a message can be sent to the user and/or a treatment can be applied by a payload for handling such events, such as water application or chemical application.

This capability also can be extended to allow monitoring vegetation across an entire work area, and even disposed about a work area in locations inaccessible to the machine 20. The system 60 can classify the vegetation and provide a recommendation for treatment in accordance with the season or weather conditions and the plant condition as detected by the system 60.

As with the detection of physical elements within the work area 74, respective classification algorithms stored in the memory 66 for analysis and running by the CPU 64 can take use of data provided by a GPS or other satellite navigation system receiver or other local positioning sensor, or a relative motion sensor for directly sensing any of the speed, acceleration, or angular velocity of the machine 20. Data from such sensor can be utilized for location determination of an aspect that has been sensed by the environment detection system 62/sensing apparatus 80. Such mapping can be communicated to the user, or to allow automation of other work area equipment such as irrigation and fertilization systems. For example, if a plant is lacking water, the irrigation at that specific area can be increased or a computerized sprinkler can be adjusted to improve the watering in that area.

In summary, a mobile outdoor power equipment machine 20 for performing a controlled task includes a drive system 24 for providing movement of the machine 20, a working apparatus 42 for performing the task, and a scanning system 62 for scanning an area 47 surrounding and extending from the machine 20. The scanning system 62 is configured to provide detection of elements in the environment to aid in navigation of the machine 20. A control system 60 is provided for controlling one or more of the drive system 24, working apparatus 42, and scanning system 62. The scanning system 62 and the control system 60 are jointly configured to scan the area 74, determine the presence of a physical element in the area 74, determine the proximity of the physical element to the machine 20, determine a confidence level of whether the physical element is an animate being, and direct a behavior of the machine 20 correlating to a combination of the confidence level and the proximity of the physical element to the mobile outdoor power equipment machine 20. In this way, the machine 20, such as a domestic robot, is configured to provide additional versatility to the user beyond the performance of the base task and/or to display enhanced avoidance techniques with respect to the physical element disposed in the work area 74 during performance of the task or travel to and from the task.

Although the disclosed technology has been shown and described with respect to a certain embodiment or embodiments, equivalent alterations and modifications will occur to others skilled in the art upon the reading and understanding of this specification and the annexed drawings. While a feature of the disclosed technology can have been described above with respect to one or more certain illustrated embodiments, the feature can be combined with one or more other features of the other embodiments, as can be suitable for any given or particular application. Devices, processes, functions and methods that come within the meaning of that which is claimed, either literally or by equivalence, are intended to be embraced therein. The disclosed technology extends to methods, system and apparatus substantially as herein described and/or as illustrated with reference to the accompanying figures.

The disclosed technology also provides a computer program or a computer program product for carrying out any of the methods described herein, and/or for embodying any of the apparatus features described herein, and a computer readable medium having stored thereon a program for carrying out any of the methods described herein and/or for embodying any of the apparatus features described herein.

The disclosed technology also provides a signal embodying a computer program or a computer program product for carrying out any of the methods described herein, and/or for embodying any of the apparatus features described herein, a method of transmitting such a signal, and a computer product having an operating system which supports a computer program for carrying out the methods described herein and/or for embodying any of the apparatus features described herein.

Any feature in one aspect of the disclosed technology may be applied to other aspects of the disclosed technology, in any appropriate combination. In particular, method aspects may be applied to apparatus aspects, and vice versa. As used herein, means plus function features may be expressed alternatively in terms of their corresponding structure, such as a suitably programmed processor and associated memory.

Furthermore, features implemented in hardware may generally be implemented in software, and vice versa. Any reference to software and hardware features herein should be construed accordingly.

It should be understood that the presently disclosed technology has been described above purely by way of example, and modifications of detail can be made within the scope of the disclosed technology.

Each feature disclosed in the description, and (where appropriate) the claims and drawings may be provided independently or in any appropriate combination.

Reference numerals appearing in the claims are by way of illustration only and shall have no limiting effect on the scope of the claims.

The invention claimed is:

1. A method for presence detection of one or more physical elements of an area surrounding a mobile outdoor power equipment machine, the method comprising:
    scanning an area surrounding the mobile outdoor power equipment machine with a sensing apparatus of the mobile outdoor power equipment machine;
    analyzing data derived from the scanning to identify a presence of a physical element in the area;
    analyzing data derived from the scanning to determine whether the physical element is located within a work area defined by a boundary;
    determining a proximity of the physical element to the mobile outdoor power equipment machine; and
    a control system of the mobile outdoor power equipment machine coupled to the sensing apparatus directing a behavior of the mobile outdoor power equipment correlating to a combination of the determination that the physical element is located within the work area and the proximity of the physical element to the mobile outdoor power equipment machine.

2. The method of claim 1, wherein the proximity is a linear distance from the mobile outdoor power equipment machine to the identified physical element.

3. The method of claim 1, wherein determining that the physical element is located within the work area comprises analyzing data derived from the scanning and associated with an area adjacent to the physical element.

4. The method of claim 1, wherein determining that the physical element is located within the work area is based on a location of the mobile outdoor power equipment machine relative to the work area and the proximity of the physical element to the mobile outdoor power equipment machine.

5. The method of claim 1, comprising determining the directed behavior in accordance with a dual classification of a confidence level of whether the physical element is an animate being and the proximity of the physical element relative to the mobile outdoor power equipment machine.

6. The method of claim 1, wherein the sensing apparatus is a camera.

7. A method for presence detection of one or more physical elements in an area surrounding a mobile outdoor power equipment machine, the method comprising:
    scanning an environment surrounding the mobile outdoor power equipment machine with a sensing apparatus of the mobile outdoor power equipment machine;
    analyzing data derived from the scanning to identify a presence of a physical element in the scanned environment;
    analyzing data derived from the scanning to determine whether the physical element is located within a work area;
    determining a location of the physical element within a predefined area disposed at least partially about the mobile outdoor power equipment machine; and
    determining a confidence level of whether the physical element is an animate being;
    a control system of the mobile outdoor power equipment machine directing a behavior of the mobile outdoor power equipment machine correlating to a combination of the determination of the physical element being an animate being, the confidence level of whether the physical element is an animate being, the determination that the physical element is located within the work area, and the location of the physical element within the predefined area.

8. The method of claim 7, wherein determining that the physical element is located within the work area comprises analyzing data derived from the scanning and associated with an area adjacent to the physical element.

9. The method of claim 7, wherein determining that the physical element is located within the work area is based on a location of the mobile outdoor power equipment machine relative to the work area and a proximity of the physical element to the mobile outdoor power equipment machine.

10. The method of claim 7, wherein the predefined area is a planar area applied to an actual topography of the environment scanned by the sensing apparatus.

11. The method of claim 7, wherein the predefined area is shaped as a circular sector.

12. The method of claim 7, wherein the sensing apparatus is a camera.

13. The method of claim 7, wherein the determining whether the physical element is an animate being includes using silhouette detection or determining whether the physical element includes facial features.

14. A mobile outdoor power equipment machine, comprising:
    a body supported by a chassis;
    one or more movable ground engaging members movably coupled to the chassis and movable by a prime mover;
    a sensing apparatus for scanning an area surrounding the mobile outdoor power equipment machine;
    a signal processing unit configured to analyze signals received by the sensing apparatus, a control system of the mobile outdoor power equipment machine having a processor and a memory and configured to analyze an output of the signal processing unit and determine the presence of a physical element in the area, analyze the output of the signal processing unit and determine whether the physical element is located within a work area defined by a boundary;

making a determination of the physical element being an animate being;

determine the proximity of the physical element to the mobile outdoor power equipment machine and direct a behavior of the mobile outdoor power equipment machine correlating to a combination of the determination of the physical element being an animate being, the determination that the physical element is located within the work area, and the proximity of the physical element to the mobile outdoor power equipment machine.

15. The mobile outdoor power equipment machine of claim 14, wherein the control system of the mobile outdoor power equipment machine is configured to determine whether the physical element is located within the work area based on an analysis of data associated with an area adjacent to the physical element.

16. The mobile outdoor power equipment machine of claim 14, wherein the control system of the mobile outdoor power equipment machine is configured to determine whether the physical element is located within the work area based on a location of the mobile outdoor power equipment machine relative to the work area and the proximity of the physical element to the mobile outdoor power equipment machine.

17. The mobile outdoor power equipment machine of claim 14, comprising a ground surface maintenance apparatus for cutting, blowing, applying water, or applying a chemical to the ground surface.

18. The mobile outdoor power equipment machine of claim 14, comprising a visual or auditory system for providing warning within the scanned area of movement of the mobile outdoor power equipment machine through the scanned area.

19. The mobile outdoor power equipment machine of claim 14, comprising a working apparatus for modifying a work area during movement through the work area.

20. The mobile outdoor power equipment machine of claim 14, wherein the sensing apparatus is a camera electronically coupled to each of the signal processing unit and the control system, and/or a visual display of the area scanned by the sensing apparatus.

\* \* \* \* \*